US010691883B2

(12) United States Patent
Rosner et al.

(10) Patent No.: US 10,691,883 B2
(45) Date of Patent: *Jun. 23, 2020

(54) INFINITE CANVAS (71) Applicant: Apple Inc., Cupertino, CA (US)

(72) Inventors: Roger Rock Rosner, Mountain View, CA (US); Jay Christopher Capela, Santa Cruz, CA (US); Yaniv Gur, Pittsburgh, PA (US); Christopher Douglas Weeldreyer, San Carlos, CA (US); Matthew Ross Lehrian, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,896

(22) Filed: Jun. 10, 2019

(65) Prior Publication Data
US 2019/0311028 A1 Oct. 10, 2019

Related U.S. Application Data (63) Continuation of application No. 11/647,944, filed on Dec. 28, 2006, now Pat. No. 10,318,624.

(51) Int. Cl.
G06F 40/18 (2020.01)
G06T 11/20 (2006.01)
G06F 40/103 (2020.01)
G06F 40/177 (2020.01)

(52) U.S. Cl.
CPC ............ *G06F 40/18* (2020.01); *G06F 40/103* (2020.01); *G06F 40/177* (2020.01); *G06T 11/206* (2013.01)

(58) Field of Classification Search
CPC .... G06F 17/246; G06F 17/245; G06F 17/212; G06T 11/206
See application file for complete search history.

(56) References Cited

U.S. PATENT DOCUMENTS

| | | | |
|---|---|---|---|
| 5,634,019 | A | 5/1997 | Koppolu et al. |
| 5,689,703 | A | 11/1997 | Atkinson et al. |
| 5,867,678 | A | 2/1999 | Amro et al. |
| 5,893,125 | A | 4/1999 | Shostak |
| 6,078,901 | A | 6/2000 | Ching |
| 6,626,959 | B1 | 9/2003 | Moise et al. |
| 6,754,885 | B1 | 6/2004 | Dardinski et al. |
| 7,401,097 | B1 | 7/2008 | Baer et al. |
| 2001/0044757 | A1 | 11/2001 | Robb et al. |
| 2002/0040410 | A1 | 4/2002 | Leach et al. |
| 2002/0070977 | A1 | 6/2002 | Morcos et al. |

(Continued)

OTHER PUBLICATIONS

Alyscia Shedd, "No Borders, No Limits: The Infinite Canvas as a Storytelling Tool in Online Comics" [online], May 1, 2005, http://www.alycashedd.com/folio/writing/sheddthesis.pdf.

(Continued)

*Primary Examiner* — Nathan Hillery
(74) *Attorney, Agent, or Firm* — Fletcher Yoder PC (57) ABSTRACT

Providing an infinite or seemingly infinite canvas as a workspace is disclosed. In some embodiments, an ability to add to a displayed canvas and view simultaneously one or more table objects, each of which has associated with it an ability to define the content of a first cell by reference to one or more other cells such that the content of the first cell is updated automatically and without further human intervention if the content of one or more of the one or more other cells is changed, is provided.

20 Claims, 6 Drawing Sheets

(56) References Cited

U.S. PATENT DOCUMENTS

| | | |
|---|---|---|
| 2002/0091871 A1 | 7/2002 | Cahill et al. |
| 2002/0116416 A1 | 8/2002 | Tesch et al. |
| 2002/0140699 A1 | 10/2002 | Miyadai |
| 2003/0004957 A1 | 1/2003 | Broman et al. |
| 2003/0169295 A1 | 9/2003 | Becerra, Jr. |
| 2003/0182621 A1 | 9/2003 | Mazza et al. |
| 2003/0200504 A1 | 10/2003 | Atkinson et al. |
| 2004/0044753 A1 | 3/2004 | Toyoshima et al. |
| 2004/0044954 A1 | 3/2004 | Hosea |
| 2004/0172592 A1 | 9/2004 | Collie et al. |
| 2004/0210822 A1 | 10/2004 | Kotler et al. |
| 2004/0236781 A1 | 11/2004 | Williams |
| 2005/0050088 A1 | 3/2005 | Kotler et al. |
| 2006/0031235 A1 | 2/2006 | Foresti et al. |
| 2006/0036964 A1 | 2/2006 | Satterfield et al. |
| 2006/0288284 A1 | 12/2006 | Peters et al. |
| 2007/0016854 A1 | 1/2007 | Burago et al. |
| 2007/0061751 A1 | 3/2007 | Cory et al. |
| 2007/0061752 A1 | 3/2007 | Cory |
| 2008/0301193 A1 | 12/2008 | Massand |
| 2011/0153647 A1 | 6/2011 | Hoellwarth |

OTHER PUBLICATIONS

Apple Computers, Inc. "Keynote 3 User Guide" Jan. 2006, Chapters 5 & 6.

INFINITE CANVAS

CROSS REFERENCE TO RELATED APPLICATIONS

This application is a continuation of U.S. patent application Ser. No. 11/647,944, entitled "Infinite Canvas," filed Dec. 28, 2006, which is hereby incorporated by reference in its entirety for all purposes.

BACKGROUND OF THE INVENTION

Figure 1:
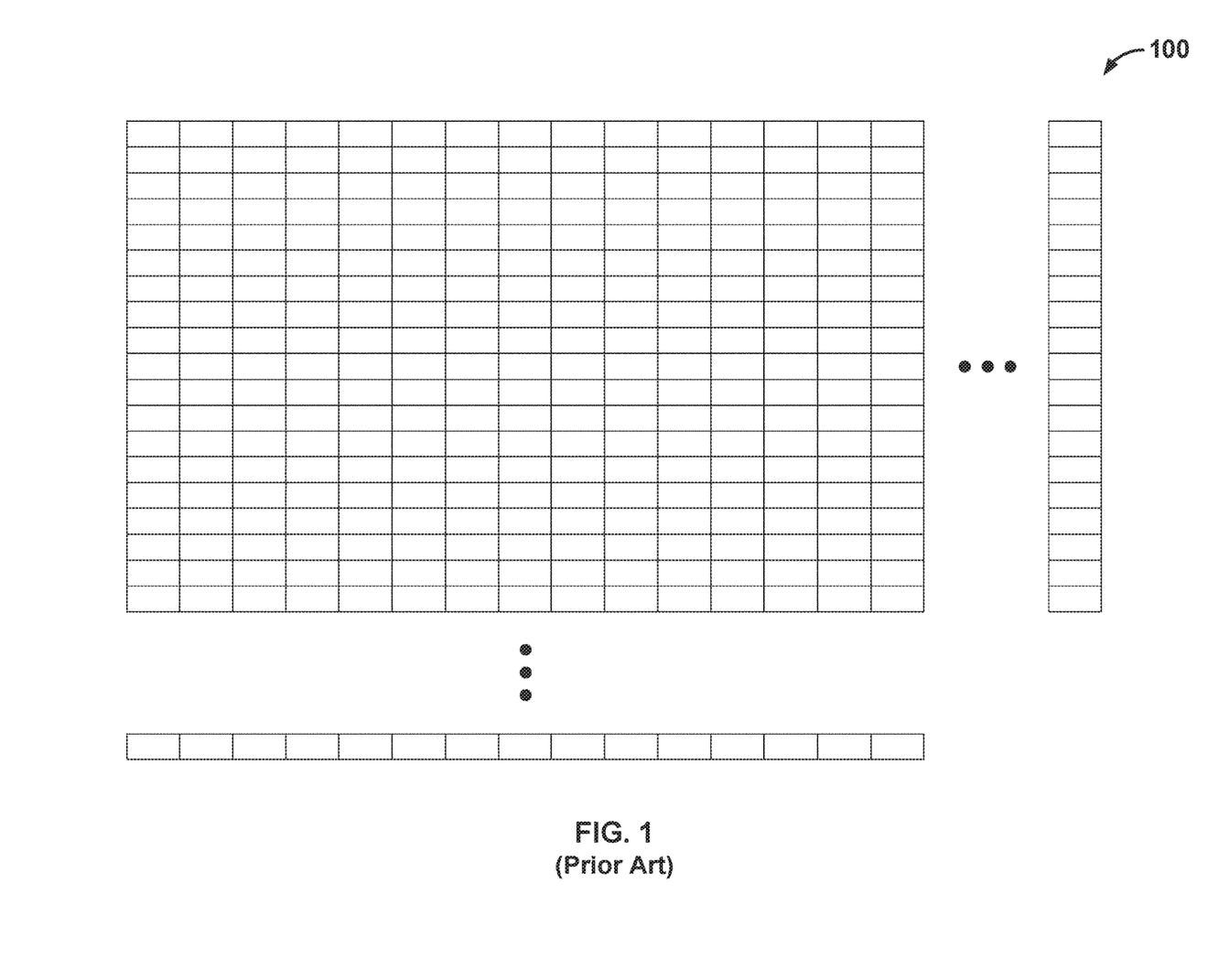
FIG. 1 illustrates an example of the workspace of a sheet of a typical prior art spreadsheet application.

The workspace of a sheet of a spreadsheet application typically comprises an infinite (or seemingly infinite) grid or table that includes an unlimited (or very large) number of rows and columns of cells. Each of the cells typically has associated with it standard spreadsheet functionalities, such as the ability to enter data, formulas, controls, etc., and may include references to values in other cells on the same sheet or on different sheets. FIG. 1 illustrates an example of the workspace 100 of a sheet of a typical spreadsheet application. The cells of such a workspace may be organized into one or more tables. Other types of objects, such as charts and graphs, that use data or information contained in one or more cells may be included in the workspace of a sheet. Moreover, objects, such as images, photographs, animations, multimedia content, etc., that do not necessarily depend on information contained in one or more cells and/or may not be associated with any spreadsheet functionality may be included in the workspace of a sheet. However, typically all such tables or other objects are associated with corresponding cells of the infinite (or seemingly infinite) grid comprising the sheet.

Although a subset of the rows and columns of cells in a workspace may be organized into a table, the cells that comprise the table are not encapsulated into a single table object. Thus, a table defined in a typical spreadsheet application lacks flexibility as a single, independent object that can, for example, be formatted, moved around in a workspace, resized, scaled, etc., as a single object. It would be useful to have a workspace in which all content is encapsulated in individual objects, each of which provides with respect to its own content corresponding spreadsheet functionalities, if any and as applicable.

Thus, there is a need for an improved spreadsheet paradigm.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing an infinite or seemingly infinite canvas as a workspace is disclosed. In some embodiments, an ability to add to a displayed canvas and view simultaneously one or more table objects, each of which has associated with it an ability to define the content of a first cell by reference to one or more other cells such that the content of the first cell is updated automatically and without further human intervention if the content of one or more of the one or more other cells is changed, is provided.

Figure 2A:
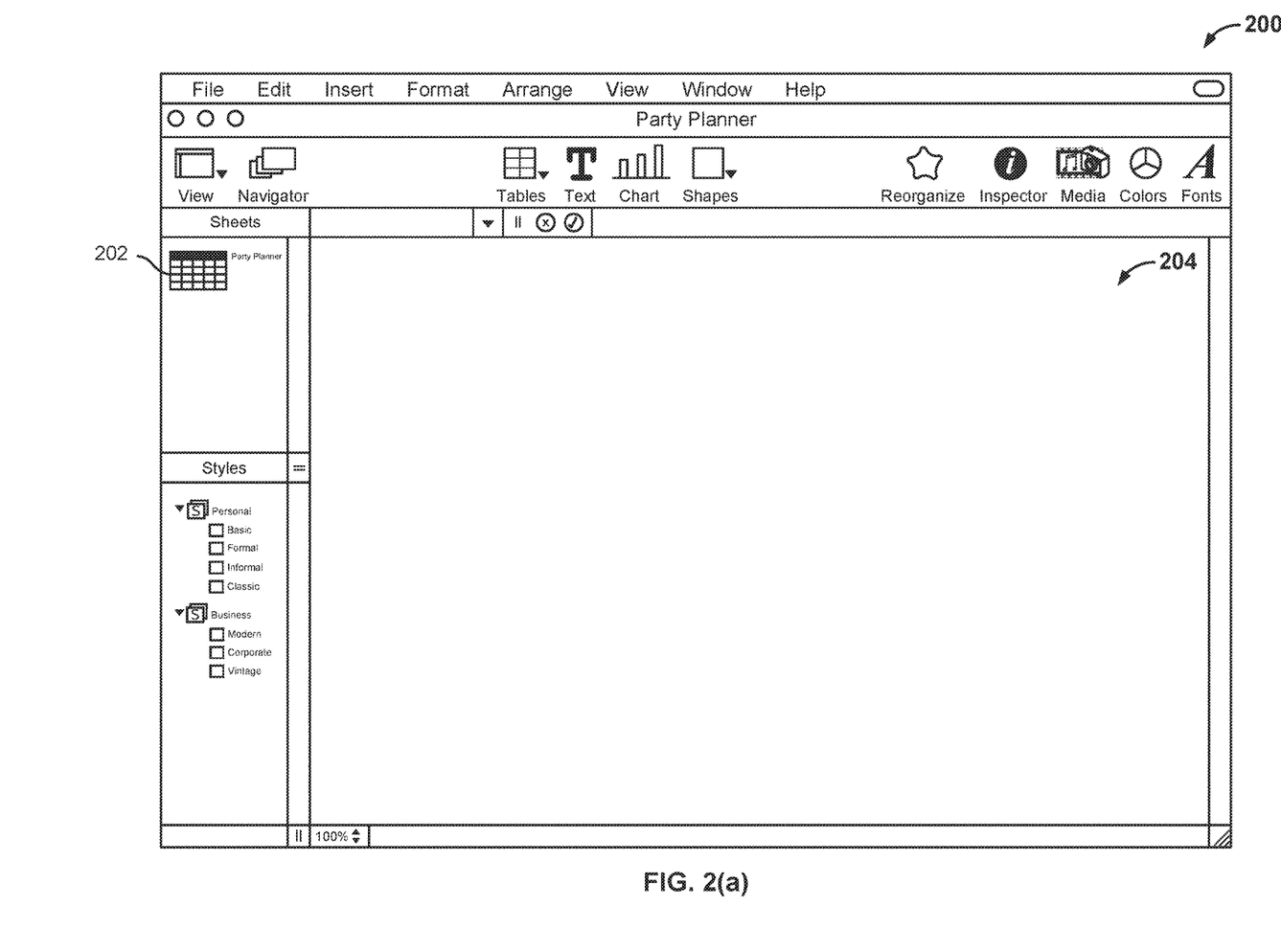
FIG. 2(a) illustrates an embodiment of a user interface of a spreadsheet application.

FIG. 2(a) illustrates an embodiment of a user interface of a spreadsheet application. The user interface 200 associated with the spreadsheet application includes various menus and options that include at least standard spreadsheet functionality. With respect to spreadsheet cells, for example, the term "at least standard spreadsheet functionality" includes the ability to define the content of one cell in such a way that the content of the one cell is determined based at least in part on the content of one or more other cells, and the content of the one cell is updated automatically without further human action if the content of one or more of the one or more other cells is changed. With respect to a chart or graph, for example, the term "at least standard spreadsheet functionality" includes the ability to define a chart or graph based at least in part on the content of one or more cells and to update the chart or graph automatically and without further human action if the content of one or more of the one or more cells is changed.

Figure 2B:
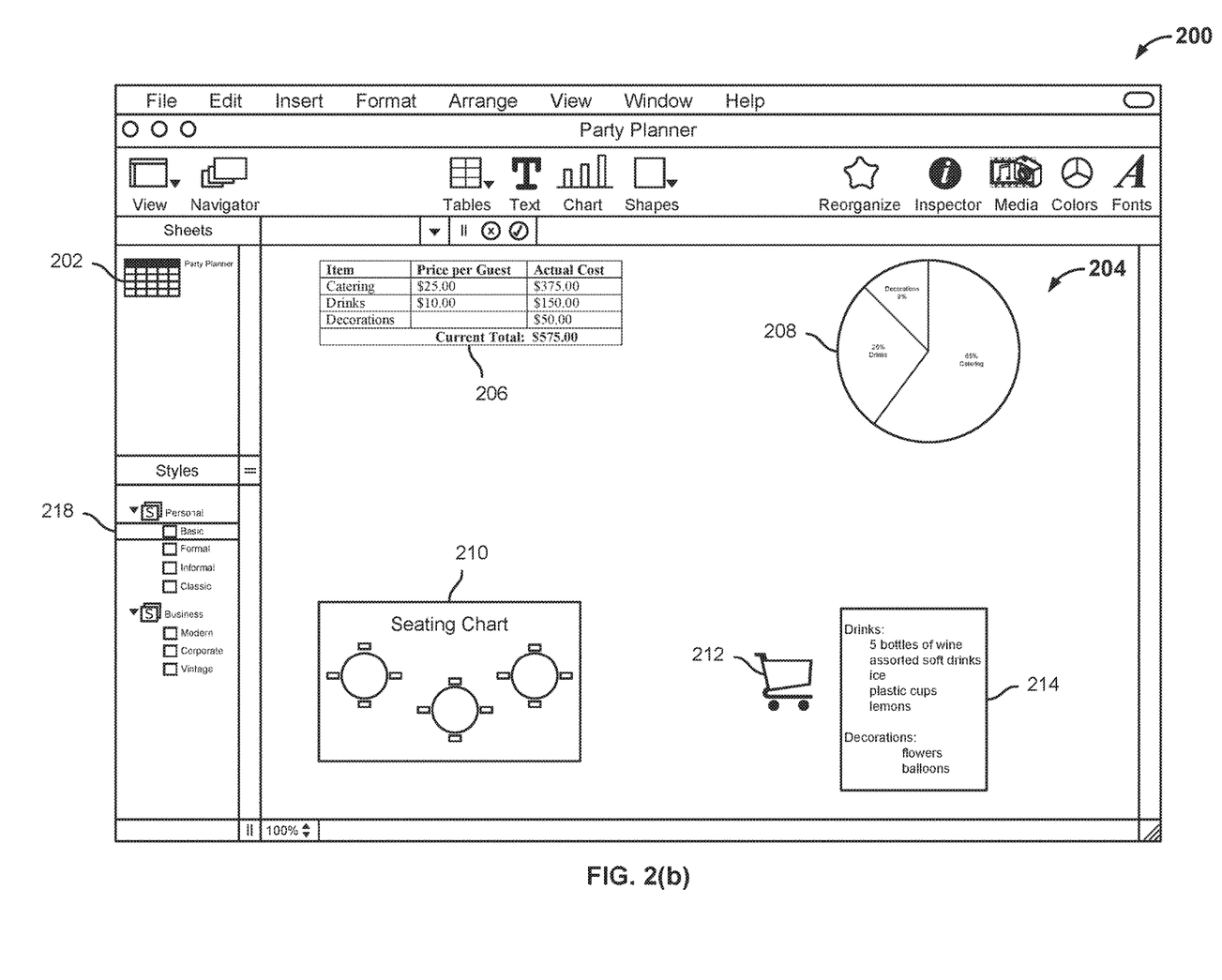
FIG. 2(b) illustrates the addition of various objects to the canvas of a spreadsheet application.

FIG. 2(a) specifically illustrates a new sheet 202 in the spreadsheet application that is named "Party Planner." The workspace of the spreadsheet application comprises a canvas 204. In some embodiments, canvas 204 is an infinite canvas. In some embodiments, canvas 204 is "seemingly infinite", or essentially the same as being infinite for practical purposes, in that it extends beyond the viewed portion shown in FIG. 2(a), in both the x and y directions, in amounts many times the portion shown in FIG. 2(a), and is of a size that is much greater than one would normally expect to be filled with content or data in a normal business, enterprise, or personal use case. In some embodiments, canvas 204 is sufficiently large that an unused portion of canvas 204 is orders of magnitude greater than a used portion to which user content has been added. In some embodiments, canvas 204 is infinite in the sense that additional space is made available automatically if an initial outer boundary is approached, e.g., by extending the boundary further out. One or more finite objects, such as tables, text, charts, graphs, shapes, images, photographs, graphics, animations, multimedia content, controls (e.g., checkboxes, sliders, steppers, buttons, knobs, popup lists, etc.), etc., may be placed on canvas 204 as desired. Depending on its type, the spreadsheet functionality associated with the type of an object placed on the canvas, if any, is available to be used with respect to that object. For example, the cells of a table object are associated with at least standard spreadsheet functionality associated with cells, including the ability to enter data, formulas, controls, etc., and may include references to values in other cells of that table or another table or object on that sheet or on a different sheet. FIG. 2(b) illustrates the addition of various objects to the canvas 204 of sheet 202. As depicted in FIG. 2(b), a table 206, a pie chart 208, various shapes collectively associated with a seating chart 210, a shopping cart image 212, and a text box 214 have been added to canvas 204. Each of the objects 206-214 is an atomic object that can be formatted, moved around on canvas 204, resized, scaled, etc., as a single object. Relationships and/or references may exist between one or more objects. For example, pie chart 208 is based on the data included in the last column (i.e. the "Actual Cost" column) of table 206.

Figure 2C:
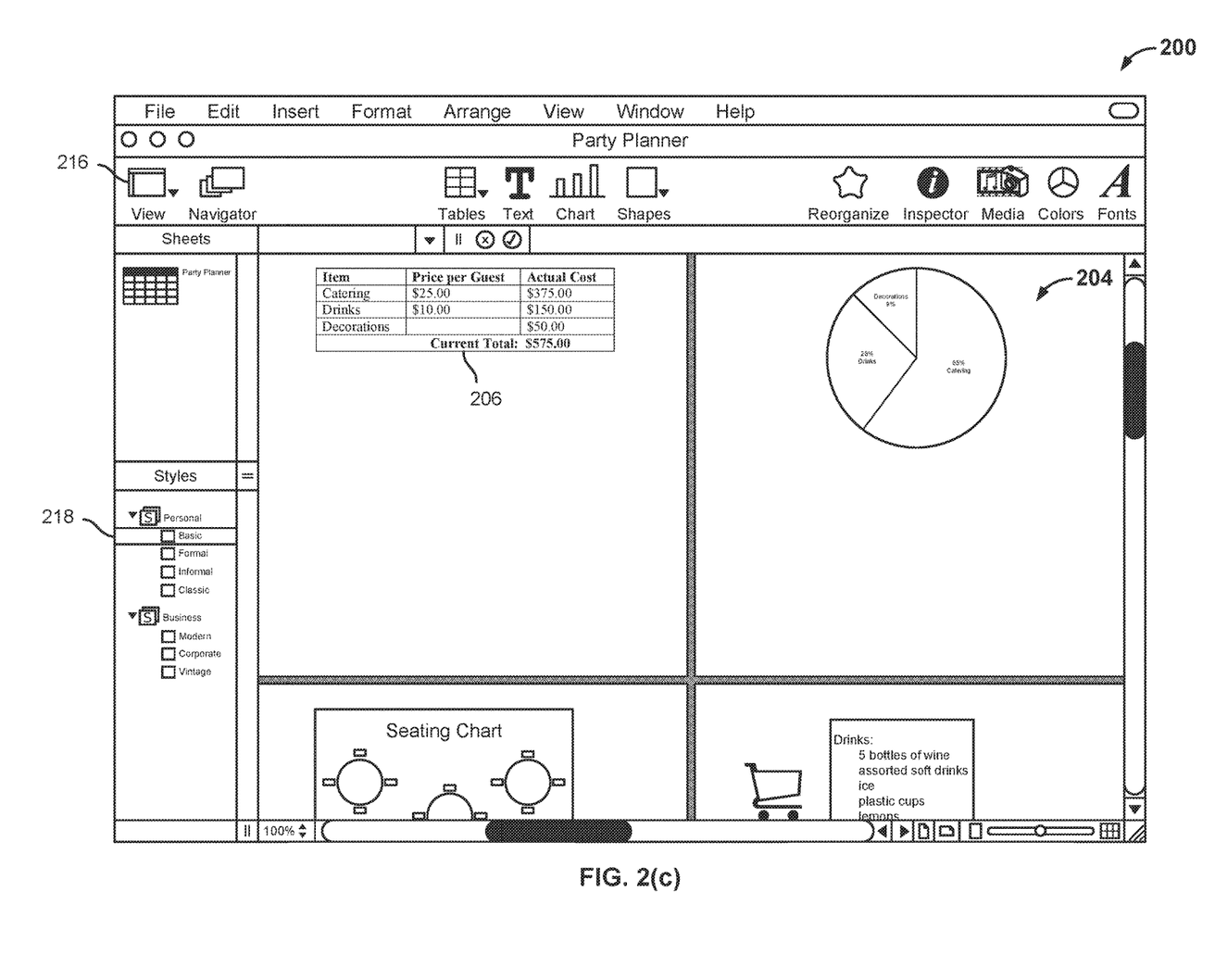
FIG. 2(c) illustrates a paginated view of the canvas of a spreadsheet application.

A spreadsheet application may include options to select different views of canvas 204. For example, a paginated view of canvas 204 may be selected via the "View" icon 216 as illustrated in FIG. 2(c) to show the pagination of the canvas, including how objects included on the canvas would be distributed, if applicable, across multiple pages. Each object placed on a canvas, including tables such as table 206, can be individually formatted, scaled, resized, and/or moved to a desired location on the canvas. With the paginated view, an object, such as a table, can be easily scaled, resized, and/or moved, such as via a drag and drop operation, to a have a desired size and position (e.g., page location and/or distribution which define the relative position at which the object would be printed if the associated sheet is printed) on the canvas. Such ease of controlling the relative location and size of a table does not exist in typical grid-based spreadsheet applications in which moving a table defined by a set of rows and columns of cells requires copying and pasting the associated cells to the desired location and scaling or resizing such a table requires manually resizing one or more of the rows and columns that comprise the table to obtain a desired size and/or page distribution of the table. In some embodiments, as and when the sizes and/or positions of one or more objects on a canvas such as canvas 204 are modified, for example, via scaling, resizing, moving, etc., the display of the objects and/or the page distribution of the objects when in a paginated view are dynamically updated, for example, while the sizes and/or positions of the one or more objects are being modified, so that the desired sizes and/or page distributions of the objects can be easily achieved. Formatting a table in typical grid-based spreadsheet applications requires individual and/or subsets of rows, columns, and/or cells to be manually formatted as desired. However, when a table comprises an independent object, the rows, columns, and/or cells of the table can be collectively formatted as a single table object as desired. In some embodiments, a predefined format may be selected to at least in part format a table. As depicted in the examples of FIGS. 2(b)-2(c), a desired style 218 is selected for table object 206.

Figure 3:
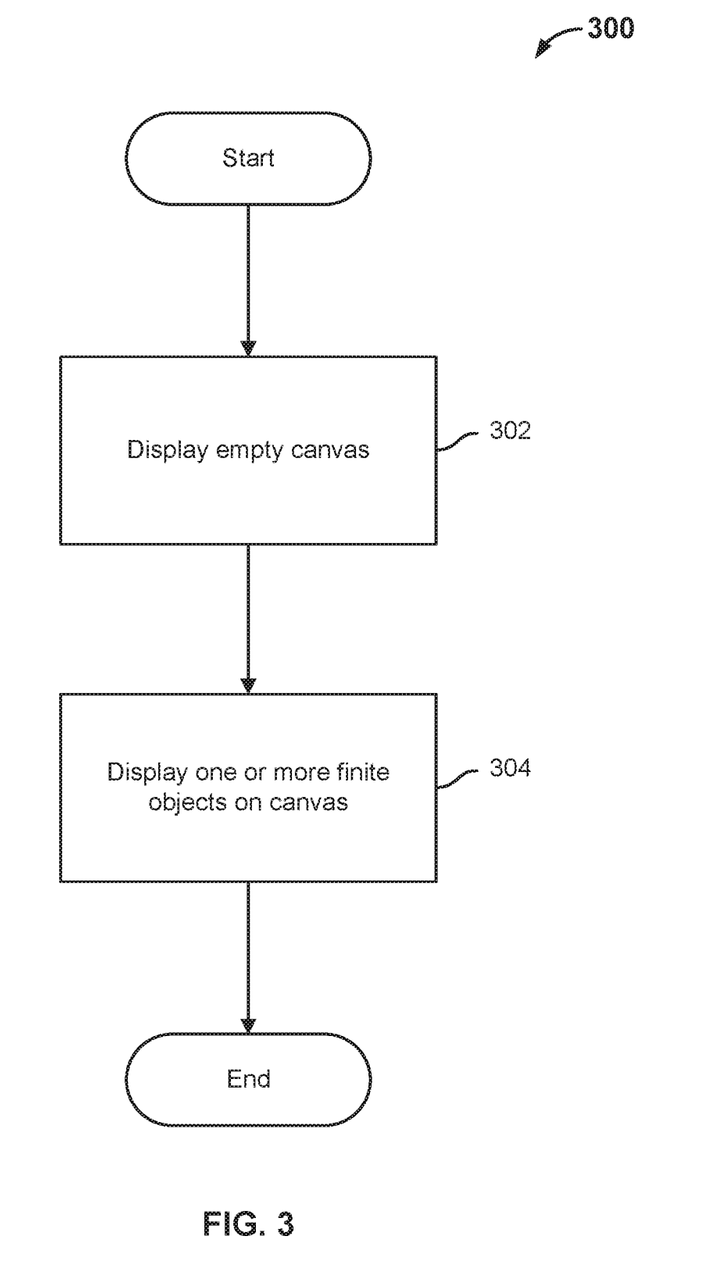
FIG. 3 illustrates an embodiment of a process for providing a workspace.

FIG. 3 illustrates an embodiment of a process for providing a workspace. In some embodiments, the workspace is associated with a spreadsheet application. Process 300 starts at 302 at which an empty canvas is displayed. For example, an empty canvas, such as canvas 204 of FIG. 2(a) is displayed at 302. In some embodiments, the canvas of 302 is an infinite or seemingly infinite canvas. At 304, one or more finite objects are displayed on the canvas. The one or more finite objects may comprise, for example, one or more tables, text boxes, charts, graphs, shapes, images, photographs, graphics, animations, multimedia content, etc. For example, with respect to FIGS. 2(a)-(c), objects 206-214 are displayed on canvas 204. In some embodiments, an object displayed at 304 is associated with at least standard spreadsheet functionalities associated with that type of object. In some embodiments, an object displayed at 304 does not include any spreadsheet functionality. Process 300 subsequently ends.

Figure 4:
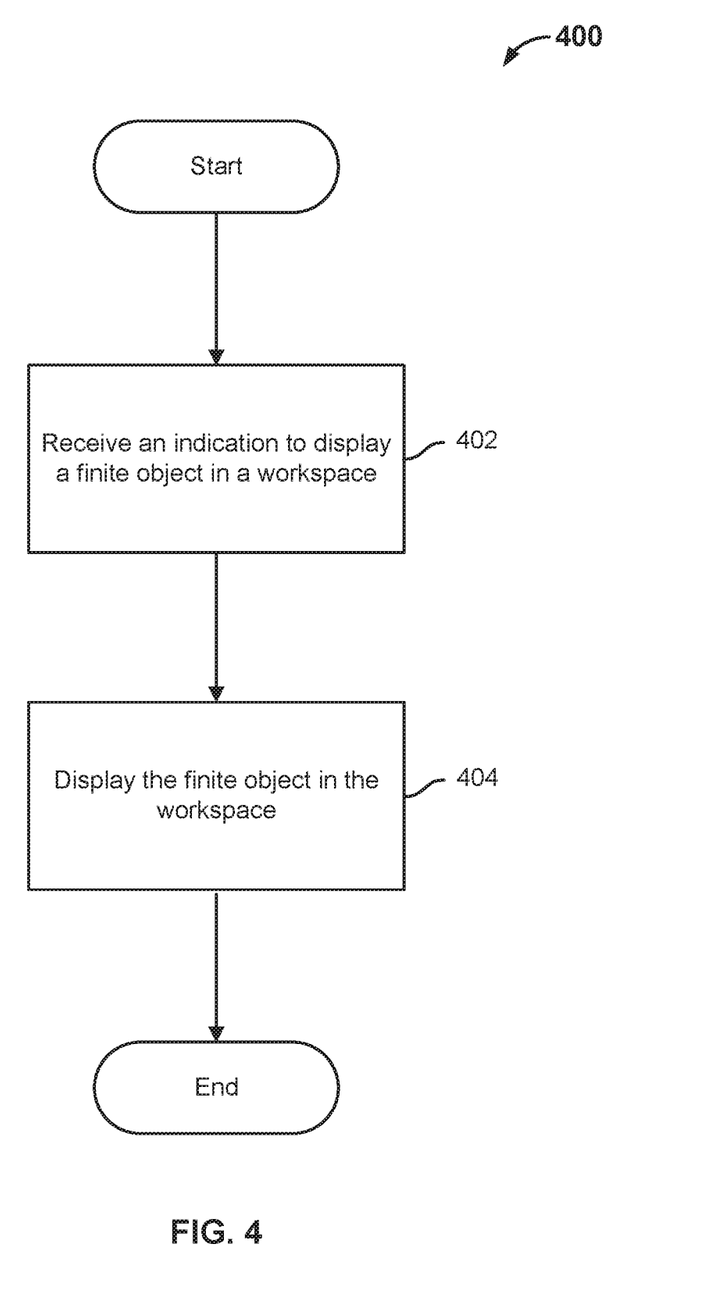
FIG. 4 illustrates an embodiment of a process for displaying an object in a workspace.

FIG. 4 illustrates an embodiment of a process for displaying an object in a workspace, such as in a spreadsheet workspace. In some embodiments, process 400 is employed at 304 of process 300 of FIG. 3. Process 400 starts at 402 at which an indication is received to display a finite object in a workspace. In some embodiments, the workspace comprises a workspace of a spreadsheet application. The indication of 402 may be received, for example, in response to the selection of the finite object via an interface associated with an associated spreadsheet application, such as interface 200 of FIGS. 2(a)-(c). In some embodiments, the workspace comprises a canvas. In some embodiments, the canvas comprises an infinite or seemingly infinite canvas. The finite object may comprise, for example, a table, text box, chart, graph, shape, image, photograph, graphic, animation, multimedia content, etc. In some embodiments, the finite object is associated with at least standard spreadsheet functionalities associated with that type of object. In some embodiments, the finite object does not include any spreadsheet functionality. At 404, the finite object is displayed in the workspace. For example, with respect to the examples of FIGS. 2(a)-(c), the selection of each object 206-214 results in the object being displayed on canvas 204. Process 400 subsequently ends. Process 400 may be repeated as one or more objects are selected to be added to a workspace. Process 400 may be employed to display one or more different types of objects, including spreadsheet and/or non-spreadsheet objects, on a single canvas, which may be associated with the workspace of any appropriate application, spreadsheet or otherwise.

In some embodiments, when a spreadsheet object is displayed in a workspace of a non-spreadsheet application, at least some of the spreadsheet functionality including relationships between objects is maintained in the non-spreadsheet application. For example, at least some of the spreadsheet functionality associated with the cells of a table object is maintained even when such an object is copied to a different application. With respect to the example of FIGS. 2(a)-(c), for instance, if table 206 and pie chart 208 are copied into the workspace of another application such as a word processing or presentation creating application, in some embodiments, at least some of the spreadsheet functionality and relationships associated with the objects are maintained. For example, if the values of the cells of the last column of table 206 are updated, pie chart 208 is dynamically updated to reflect the changes in the non-spreadsheet application. Such interoperability of objects across applications may be possible, for example, in a suite of applications that share the same or a similar framework.

As described herein, various types of objects which may or may not have associated spreadsheet functionality may be placed in the workspace of a spreadsheet application. As also described, an open canvas on which one or more finite objects can be placed results in an improved spreadsheet workspace on which objects including tables can be individually manipulated, e.g., formatted, scaled, resized, moved, etc., to achieve a desired configuration. Finite tables whose cells have at least standard spreadsheet functionality that can be added to such a canvas allow the elimination of the infinite or seemingly infinite grid of cells associated with traditional spreadsheet workspaces, resulting in a cleaner and less complicated view of the workspace of a spreadsheet application. Although encapsulating spreadsheet cells into a single table object has been described herein with respect to a spreadsheet application that includes a canvas as a workspace, the techniques described herein can be similarly extended to encapsulating a group of cells as a single table object in traditional spreadsheet application workspaces or other similar applications.

Although a spreadsheet application and user interface are described in the examples discussed in detail above, the techniques described herein may be employed with respect to any other application, spreadsheet or otherwise, and associated user interface.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A tangible, non-transitory, machine-readable-medium, comprising machine-readable instructions that, when executed by processing circuitry, cause the processing circuitry to:
provide a workspace of a spreadsheet interface, wherein the workspace comprises a canvas extending in an x-direction or a y-direction beyond a visible portion of the workspace within the spreadsheet interface, wherein each time a boundary of the visible portion of the workspace is approached, the boundary is extended such that a portion of the canvas that was beyond the visible portion of the workspace is within the visible portion of the workspace; and
add a set of spreadsheet cells to the canvas.

2. The tangible, non-transitory, machine-readable-medium of claim 1, wherein the set of spreadsheets cells is encapsulated in a table.

3. The tangible, non-transitory, machine-readable-medium of claim 2, wherein the table is configured to be formatted, moved around, resized, scaled as a single object, or any combination thereof.

4. The tangible, non-transitory, machine-readable-medium of claim 1, wherein the machine-readable instructions, when executed by the processing circuitry, cause the processing circuitry to add an object comprising content to the canvas.

5. The tangible, non-transitory, machine-readable-medium of claim 4, wherein the content of the object is configured to update based on a change to the set of spreadsheet cells.

6. The tangible, non-transitory, machine-readable-medium of claim 4, wherein the object is configured to be formatted, moved around, resized, scaled as a single object, or any combination thereof.

7. The tangible, non-transitory, machine-readable-medium of claim 5, wherein the object comprises a text box, chart, graph, shape, image, photograph, graphic, animation, multimedia content, or control.

8. A system comprising:
an electronic display;
a memory configured to store machine-readable instructions; and
processing circuitry configured to execute the machine-readable instructions, wherein the machine-readable instructions, when executed by the processing circuitry, cause the processing circuitry to:
display a workspace of a spreadsheet interface on the electronic display, wherein the workspace comprises a canvas extending in an x-direction or a y-direction beyond a visible portion of the workspace within the spreadsheet interface, wherein each time a boundary of the visible portion of the workspace is approached, the boundary is extended such that a portion of the canvas that was beyond the visible portion of the workspace is within the visible portion of the workspace; and
add an object to the canvas.

9. The system of claim 8, wherein the object comprises a set of spreadsheet cells.

10. The system of claim 8, wherein the canvas comprises an infinite canvas.

11. The system of claim 8, wherein the machine-readable instructions, when executed by the processing circuitry, cause the processing circuitry to dynamically update display of the object based on scaling, resizing, or moving the object.

12. The system of claim 8, wherein the machine-readable instructions, when executed by the processing circuitry, cause the processing circuitry to display a paginated view of the canvas.

13. The system of claim 12, dynamically update a page distribution of the object based on scaling, resizing, or moving the object.

14. The system of claim 8, wherein the canvas comprises a viewed portion, wherein the canvas extends beyond the viewed portion.

15. A method for providing a spreadsheet application, comprising:
providing a workspace of a spreadsheet interface, wherein the workspace comprises a canvas extending in an x-direction or a y-direction beyond a visible portion of the workspace within the spreadsheet interface, wherein each time a boundary of the visible portion of the workspace is approached, the boundary is extended such that a portion of the canvas that was beyond the visible portion of the workspace is within the visible portion of the workspace; and
adding a set of spreadsheet cells to the canvas.

16. The method of claim 15, wherein the set of spreadsheets cells is encapsulated in a table.

17. The method of claim 16, comprising resizing the table on the canvas.

18. The method of claim 17, wherein resizing the table on the canvas is performed via a drag and drop operation.

19. The method of claim 16, comprising moving the table on the canvas.

20. The method of claim 17, wherein moving the table on the canvas is performed via a drag and drop operation.

* * * * *